(12) United States Patent
Tolbert

(10) Patent No.: US 9,330,147 B2
(45) Date of Patent: May 3, 2016

(54) DATABASE AND DATA BUS ARCHITECTURE AND SYSTEMS FOR EFFICIENT DATA DISTRIBUTION

(71) Applicant: Unisys Corporation, Blue Bell, PA (US)

(72) Inventor: Douglas M Tolbert, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 600 days.

(21) Appl. No.: 13/709,579

(22) Filed: Dec. 10, 2012

(65) Prior Publication Data

US 2014/0164431 A1    Jun. 12, 2014

(51) Int. Cl.
*G06F 7/00* (2006.01)
*G06F 17/30* (2006.01)

(52) U.S. Cl.
CPC ................ *G06F 17/30557* (2013.01)

(58) Field of Classification Search
CPC ............... G06F 17/30864; G06F 17/30867; G06F 17/30067
USPC ....................................................... 707/705
See application file for complete search history.

(56) References Cited

U.S. PATENT DOCUMENTS

| | | | |
|---|---|---|---|
| 6,609,123 B1* | 8/2003 | Cazemier | G06F 17/30607 |
| 8,027,349 B2* | 9/2011 | Brown | G05B 19/4185 |
| | | | 370/399 |
| 8,418,072 B1* | 4/2013 | Bauer | G06F 8/38 |
| | | | 700/223 |
| 2006/0047780 A1* | 3/2006 | Patnude | H04L 67/02 |
| | | | 709/219 |
| 2006/0274727 A1* | 12/2006 | Musayev | H04L 67/32 |
| | | | 370/352 |

* cited by examiner

*Primary Examiner* — Azam Cheema
(74) *Attorney, Agent, or Firm* — James E. Goepel

(57) ABSTRACT

Systems and methods for managing distributed data using any of a plurality of data models are disclosed. One method includes receiving a data request from one of a plurality of database interfaces, each database interface associated with a different data model type. The method further includes translating the data request to a second data request based at least in part on a data model neutral description of a data model in the data store that is associated with data and the database interface, wherein the data store maintains descriptions of each of a plurality of different data models corresponding to the different data model types. The method also includes executing the second data request, thereby reflecting the data request in data storage such that data is managed consistently across each of the plurality of database interfaces.

21 Claims, 8 Drawing Sheets

DATABASE AND DATA BUS ARCHITECTURE AND SYSTEMS FOR EFFICIENT DATA DISTRIBUTION

TECHNICAL FIELD

The present application relates generally to database and data bus architectures. In particular, the present application relates generally to a database and data bus architecture arrangement providing for systems for efficient data distribution.

BACKGROUND

In traditional system architectures, an operating system executes on computing hardware, and can host a particular database management system and database storage arrangement. For example, selected computer hardware having a particular system architecture (e.g., compliant with the x86, x86-64, IA64, PowerPC, ARM, or other system architectures) can host an operating system specifically written for or compiled for that architecture. That operating system (e.g., Windows, Linux, etc.) can then host a corresponding database and associated database management system.

Within this construct, various database architectures have emerged. For example, relational databases have been developed, in which data requests, such as queries, can be submitted in a relational query structure (e.g., using SQL or some similar language). Generally, data in such relational databases are stored in records, with interrelationships across table entries in one or more tables, with query results returned in terms of row and table references. In other examples, hierarchical databases have also been developed which store data in records, but generally query results are returned in record and set references. Still other database architectures are implemented using different access procedures, such as storage in columns, records, streams, or other structures.

Increasingly, a number of limitations of computing infrastructure have begun to affect these database arrangements. For example, some relational and hierarchical database management systems assume all data is to be stored on a particular partition or computing system, and as such are either unable to or are inefficient at obtaining data stored in separate memories or memory partitions. Furthermore, existing application level programs may be written for use with a relational system when data is stored in a hierarchical database, or vice versa, thereby complicating data access issues. In such situations, it may be the case that separate transactional and relational database instances must be maintained, leading to data consistency and replication difficulties. Or, hierarchical database commands must be translated to a relational database language, accounting for the difference between such data models. In both circumstances, inefficiencies exist in storage and retrieval of data, and limitations as to methods (i.e., database commands and query languages) persist.

For these and other reasons, improvements are desirable.

SUMMARY

In accordance with the following disclosure, the above and other issues are addressed by the following:

In a first aspect, a computer-implemented method for managing distributed data using any of a plurality of data models is disclosed. The method includes determining a data request from one of a plurality of database interfaces, each database interface associated with a different data model type. The method further includes translating the data request to a second data request based at least in part on a data model neutral description of a data model that is associated with data and the database interface, wherein the data model neutral description is included in a plurality of descriptions of each of a plurality of different data models corresponding to the different data model types. The method also includes executing the second data request, thereby reflecting the data request in data storage such that data is managed consistently across each of the plurality of database interfaces.

In a second aspect, a data storage system is disclosed. The data storage system includes a plurality of database interfaces each associated with a different data model type and having a different set of database commands associated therewith. The data storage system further includes a data model neutral data layer including data storage distributed across a plurality of computing systems. The data model neutral data layer is configured to translate data requests from each of the plurality of database interfaces, based at least in part on database commands received at the plurality of database interfaces, to data model neutral data requests.

In a third aspect, a computer-implemented method for managing distributed data using any of a plurality of data models is disclosed. The method includes receiving a query at a database interface selected from a group of database interfaces, each of the database interfaces associated with a different data model type and having a different set of supported database commands. The method also includes transmitting a data request from the database interface to a common data storage layer, the data request based on the query, and translating the data request to a data model neutral data request within the common data storage layer based at least in part on a description of a data model stored within a plurality of metadata atoms describing each of a plurality of different data models. Each of the plurality of different data models has one of the plurality of different data model types. The method further includes communicating the data model neutral data request to data storage systems within the common data storage layer model, the common data storage layer including data storage distributed across a plurality of computing systems. The method also includes receiving data representing a set of data model neutral results received from the plurality of computing systems in response to the data request, and translating the data to a format consistent with the data model and expected by the database interface responsive to the query.

DETAILED DESCRIPTION

Figure 1:
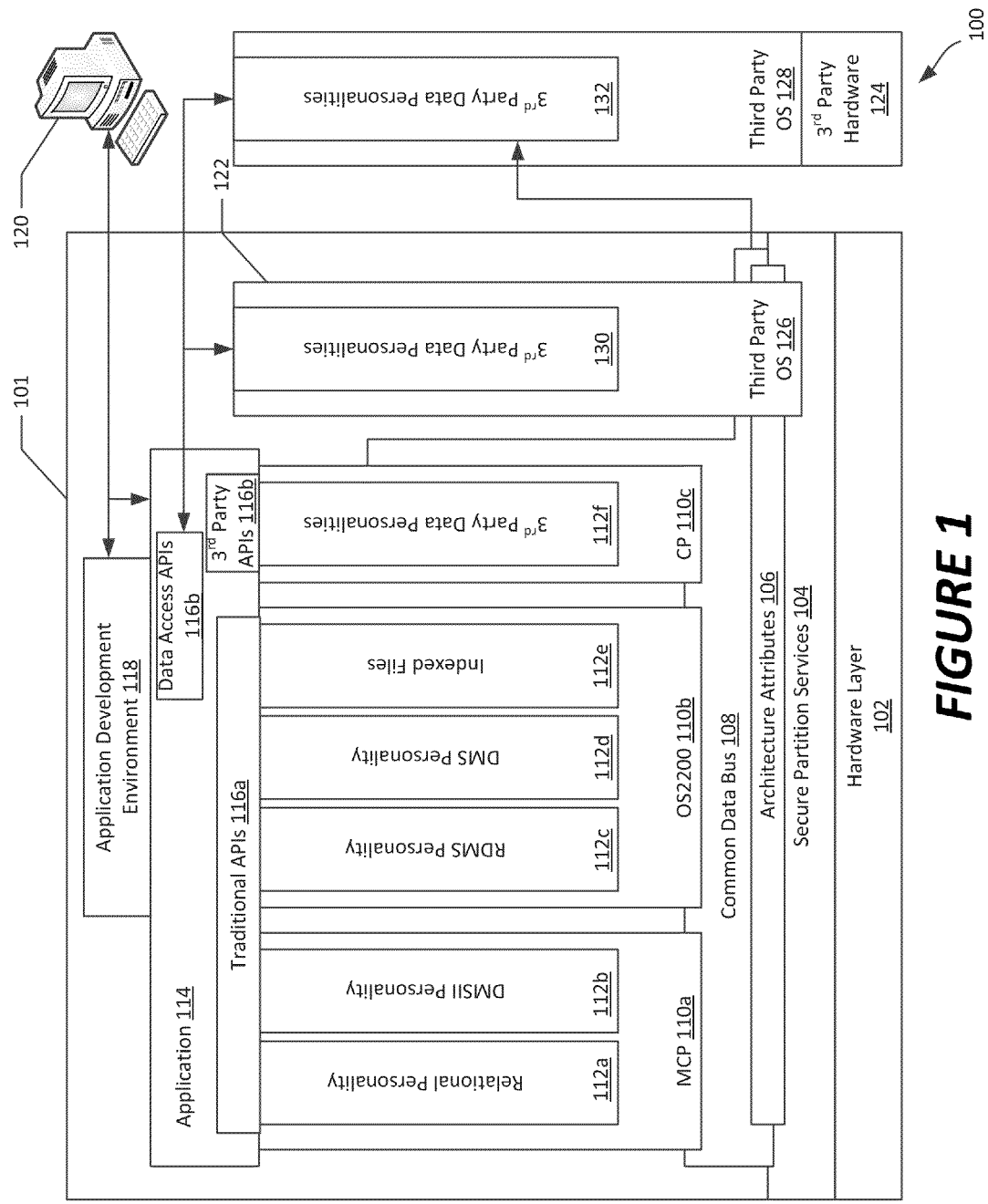
FIG. 1 is a logical diagram of a data storage system according to an example embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to database and data bus architectures. In particular, the present application relates generally to a database and data bus architecture arrangement providing for systems for efficient data distribution. The database and data bus architectures disclosed herein represent systems in which a unified, data model neutral data storage arrangement can be used as a data layer, with existing database management systems operating to provide different views into a unified, data model neutral data layer. In example embodiments, the data model neutral layer can maintain descriptions of the data models associated with each database interface to provide a definition that allows replication of data across different data models of different data model types. In other example embodiments, the data model neutral layer can maintain both descriptions of the data models associated with each database interface and a data model neutral data layer, thereby avoiding replication of data but rather maintaining a single data model neutral set of data, upon which various views can be generated for each of a plurality of database interfaces having different data model types.

In general, and as discussed herein, a data model corresponds to a particular arrangement of data for use in a database. For example, the data model can correspond to a particular database structure or schema that is specific to the data stored in a database. Analogously, a data model type, as referred to herein, corresponds to a particular type of arrangement of data, whether it be a relational, hierarchical, multi-dimensional, object oriented, columnar, network, record, or stream arrangements for data, or any other data model type. Accordingly, data model neutral data corresponds to data that is not stored in a manner that relies upon a particular data structure, but rather can be described across a variety of such structures. Examples of each of these concepts are generally provided in further detail below in conjunction with the various embodiments of the present disclosure.

Referring now to FIG. 1, a logical diagram of a data storage system 100 is shown, according to an example embodiment of the present disclosure. In general, the data storage system 100 corresponds to an implementation of a data storage system in which data models are described in a data model neutral arrangement, but in which data is maintained associated with existing database systems. Accordingly, the data storage system 100 represents an arrangement in which a data model neutral software layer operates as a data bus for exchanging data across various databases each managed by separate database management systems, or database interfaces, having different data model types.

In the embodiment shown, the data storage system 100 includes a virtualization space 101 executable on a hardware layer 102. The hardware layer 102 supports secure partition services 104. The hardware layer 102 generally corresponds to a large, multiprocessor, networked arrangement including a plurality of computing systems. As further discussed below in connection with FIGS. 4-5, the hardware layer 102 can be assigned to and affiliated with particular portions of the data storage system 100 in a variety of ways, but generally provides processing and memory resources useable to implement a database and database application architecture. The hardware layer can be constructed from one or more server computers, an example of which is discussed below in connection with FIG. 5.

The secure partition services 104 provides a low-level software layer above the hardware layer 102, and generally corresponds to a virtualization layer useable to host various types of operating systems that may or may not be compatible with the hardware layer 102. For example, the secure partition services 104 can correspond to a hypervisor software layer installed on one or more computing systems, capable of collectively partitioning available hardware resources available within a computing system into a plurality of partitions. As discussed below in connection with FIG. 4, each of the partitions represent a defined collection of hardware resources capable of being allocated to a hosted operating system, such that the hosted system views the allocated resources, via the hypervisor, as a computing system itself. In one example embodiment, the secure partition services 104 correspond to S-Par secure partitioning hypervisor software from Unisys Corporation of Blue Bell, Pa. Of course, other secure partition services could be used as well.

In the embodiment shown, the secure partition services 104 host a set of architecture attributes 106 and a common data bus 108. The architecture attributes 106 reside in a layer above the secure partition services 104, in that they are published to various partitions 110 (shown as partitions 110a-d). In various embodiments, the architecture attributes 106 can include, for example, emulated processing, memory, networking and/or other attributes made available to the partitions 110.

The common data bus 108 hosts and supports data exchange across the plurality of partitions 110, to allow for cross-pollination of data between the partitions, for use by the operating systems and software installed thereon. In particular, the common data bus 108 stores metadata describing, for example, a particular file system and/or database structure or schema used in a particular partition, such that when data is stored or altered in that partition, the common data bus 108 detects the data change and replicates that change of data across the other partitions. In various embodiments, the common data bus 108 can be configured to detect changes in data in virtual file systems or virtual database files in the various partitions 110, and replicate data between those systems based on known interrelationships between those data structures. For example, the common data bus 108 can be implemented using one or more transforms developed between source and target computing system file systems and/or database systems, and includes the software necessary to support export of data from each partition (e.g., from the file system within a particular partition, or within a database having a schema hosted within the partition).

In the embodiment shown, each of the partitions 110 supported by the secure partition services 104 and common data bus 108 are configured to support any of a variety of operating systems and/or database management systems and database architectures. In the example depicted, a first partition 110a hosts a first operating system, depicted as an MCP operating system provided by Unisys Corporation of Blue Bell, Pa. Similarly, other partitions within the system may host different types of systems; in the embodiment shown, a second partition 110b hosts a second operating system, shown as the OS2200 operating system, also from Unisys Corporation of Blue Bell, Pa. A third operating system simply illustrated as a coprocessor, or "CP" is also illustrated as associated with a third partition 110c. Other partitions, such as partitions maintaining third party operating systems (e.g., Linux, Windows-based, or other operating systems) could be incorporated as well.

Within each of the partitions 110a-c, each partition may include one or more data personalities 112. Data personalities 112 generally refer to structures or arrangements by which data is accessed and understood. For example, data personalities may correspond to a data model type of a database, such as a relational, hierarchical, multidimensional, columnar, network, record, stream or object oriented data model type. Data personalities generally describe the expected operation of an interface to data, rather than the specific structure of a given data set. Such a specific structure, or data model, corresponds to a particular schema of that data set as may be designed within the data model type.

In the example embodiment shown, the first partition 110a including the MCP operating system hosts two data personalities, a relational data personality 112a (such as would be expected of a SQL or other relational database) and a DMSII personality 112b, useable with DMSII database management system from Unisys Corporation of Blue Bell, Pa. Similarly, the second partition 110b is illustrated as supporting an RDMS personality 112c, a DMS personality 112d, and indexed files in a file system (i.e., a file-based data personality 112e).

In the arrangement shown, each of the partitions 110a-c can be made available to a further partition or application executing within one of those partitions, illustrated as a data access application 114. The application 114 can access one or more APIs 116, shown as traditional APIs 116a and third party APIs 116b for accessing data stored using nonstandard third party data personalities. The APIs 116 are published for use with each of the variety of data personalities 112, for accessing data in the various partitions. As such, the application can access data as needed from each of the various data personalities—e.g., in a relational format from a relational database personality such as personality 112a, or hierarchical data from a hierarchical database personality (e.g., the DMSII personality 112), or other data access arrangements.

Use of a common data bus 108 to provide data synchronization across partitions, in particular in an example arrangement such as that depicted in FIG. 1, provides a number of advantages over existing hypervisor systems or even existing data replication systems. Because an application can access data from each of the various data personalities, the application can be designed to access data according to different personalities (rather than being written to interface with a particular data model type), and can request and receive data from a selected personality based on the suitability of the data model type associated with that data personality. For example, an application could both store data according to a DMSII data personality 112b, and could retrieve data in a reporting format from a relational data personality 112a, or a multidimensional data personality, or some other convenient format. Using the common data bus 108, each of the data personalities is kept up-to-date via transformations of the data at the time it is stored in each personality, thereby providing convenient retrieval of data in a convenient format, from a supported API, at the application level regardless of whether the data was originally stored in a database having the particular personality from which retrieval is desired. As such, data is available from each of the data personalities 112 at essentially data retrieval speeds, since each data personality would not be required to communicate across to other data personalities to retrieve such data (assuming sufficient time between data storage in one data personality and retrieval in another data personality to allow for replication of the data in each of the data models and data model types associated with each of the personalities supported within a particular system. Optionally, an application development environment 118 could be included as well which allows a designer to create applications designed to interface with various data personalities via the APIs 116a-b. The data personalities 112 allow applications to be written using the application development environment 118 that are capable of accessing data from any of the personalities.

As illustrated in system 100, a remote system 120, such as a client system or other remote server, can be communicatively connected to the virtual system 101, e.g., for communication with the application 114, or application development environment 118. For example, the application 114 or application development environment can have a web interface, either directly supported within one of the partitions in which the application or application development environment reside, or in a separate partition, managing access to that system.

It is noted that, as illustrated, other third party systems can be incorporated into the overall system 100. In the embodiment shown, one such third party system 122 can be included within the overall virtualized system 101, hosted by secure partitioning services 104, and a further third party system 124 is remote from the overall system 100, and communicatively connected to the system by the common data bus 108. These third party systems are shown to illustrate example interoperability of the common data bus 108 with third party systems. In connection with third party system 122, the common data bus 108 can be extended, on a case-by-case basis, to such third party systems by establishing a relationship between known data personalities of the supported systems and those developed by third parties. In the example shown, both third party systems 122, 124 operate third party operating systems 126, 128, respectively, and have specific third party data personalities 130, 132. These may be the same, or different, operating systems and/or data personalities. Further, as illustrated in FIG. 1, third party operating system 128 can be communicatively connected to the system despite running on incompatible third party hardware 134.

Figure 2:
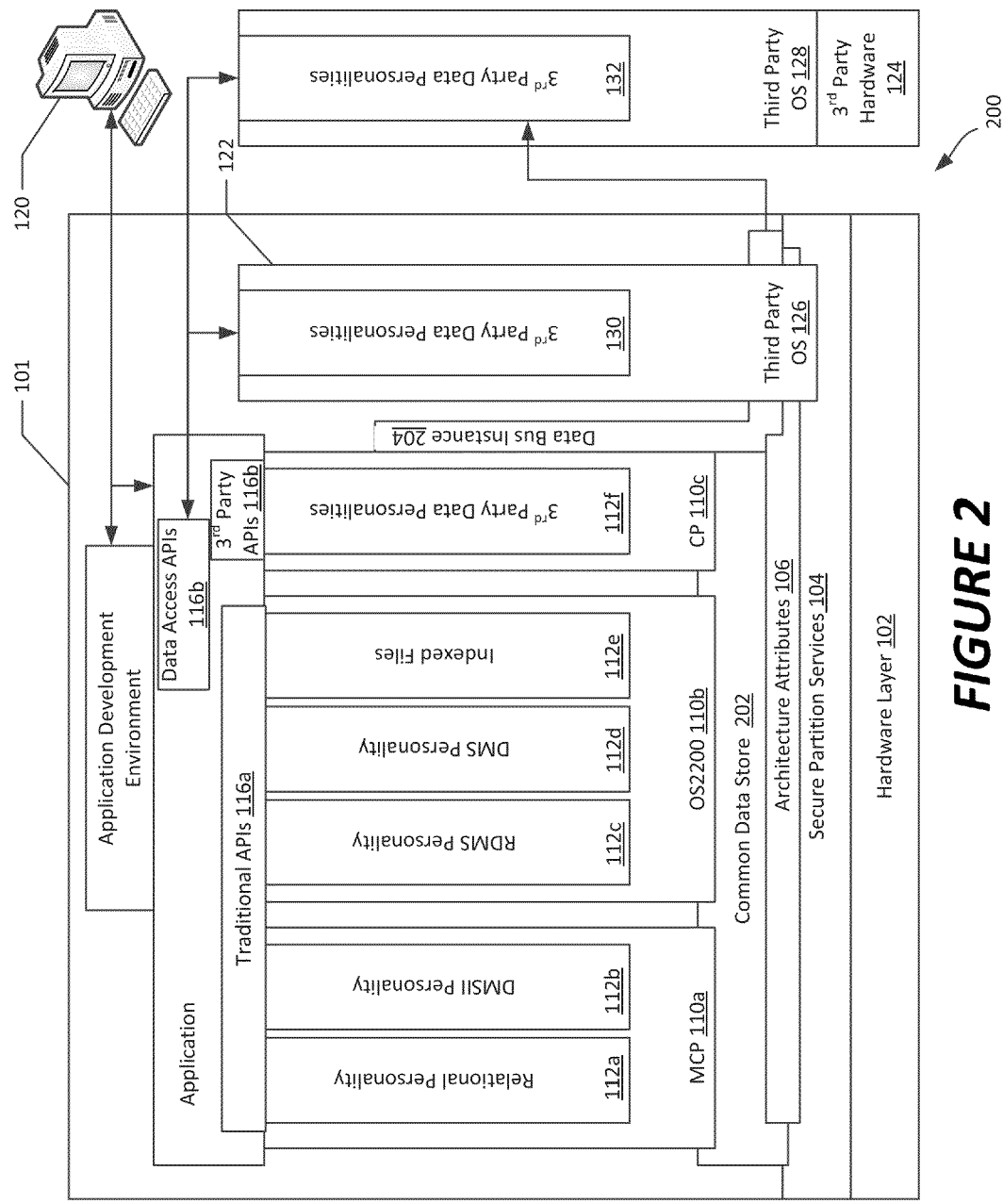
FIG. 2 is a logical diagram of a data storage system according to a second possible embodiment.

Although the system 100 of FIG. 1 has numerous advantages, it is noted that, in particular for large data collections, some inefficiencies may exist, for example due to the requirement that data be replicated as many times as there are different data personalities. Accordingly, and as illustrated in FIG. 2, an alternative embodiment of a database and data bus architecture is contemplated, in which a system 200 reduces the amount of data replication involved. In connection with the system 200, a common data store 202 takes the place of the common data bus 108 for at least a supported portion of the system 200, namely one or more partitions 110 having known data personalities. In this embodiment, each of the partitions that are capable of connection to the common data store 202 no longer are required to independently maintain storage of data associated with the particular data personalities to which they relate, but instead request data from a common data store that stores data in a data model neutral format. Although examples of such a format are discussed in further detail below, it is noted here that any of a variety of formats that do not specifically rely on positional interrelationships among data elements (e.g., within a common table or data record) to define relationships can be used. For example, unstructured data, such as key-value pairs or other types of data labeling, could be used.

In the particular embodiment shown, the common data store 202 is configured to provide an interface between each of a plurality of data personalities 112 and the underlying data by providing a conduit for data storage from each of the supported partitions 110. In the embodiment shown, the common data store 202 is interfaced to partitions 110a-c, and provides data to data personalities 112a-f. As such, data personalities 112a-f, rather than representing database systems as in FIG. 1, effectively act as data views on data in the common data store 202.

The common data store 202 can be interfaced to a common data bus 204, which acts analogously to the common data bus 108 of FIG. 1, but for only unsupported data structures, i.e., data personalities for which the common data bus 204 may have some knowledge of the data format type, but the common data store 202 lacks knowledge of the data format of the data personality itself. In other words, the common data store acts as a structure-independent database capable of being maintained in synchronization with external data personalities, such as data personalities 112g, 112h, using the common data bus 204. In this arrangement, the common data bus 204 would not be required to directly interface with data personalities 112a-f, since those data personalities would not directly store data; rather, the common data store 202 would manage that data, and would be maintained in synchronization with the common data bus 204.

In the embodiment shown, it is noted that additional features can be incorporated in the common data store 202, in addition to those managed in the common data bus 204. For example, functionalities that are related to database functions but which are not part of a particular data model can entirely be managed within the common data store; for example, transaction management, recovery, backup, and other data functions can be managed within the common data store 202. Other functionalities typically associated with database management systems could be incorporated into a common data store as well.

Figure 3:
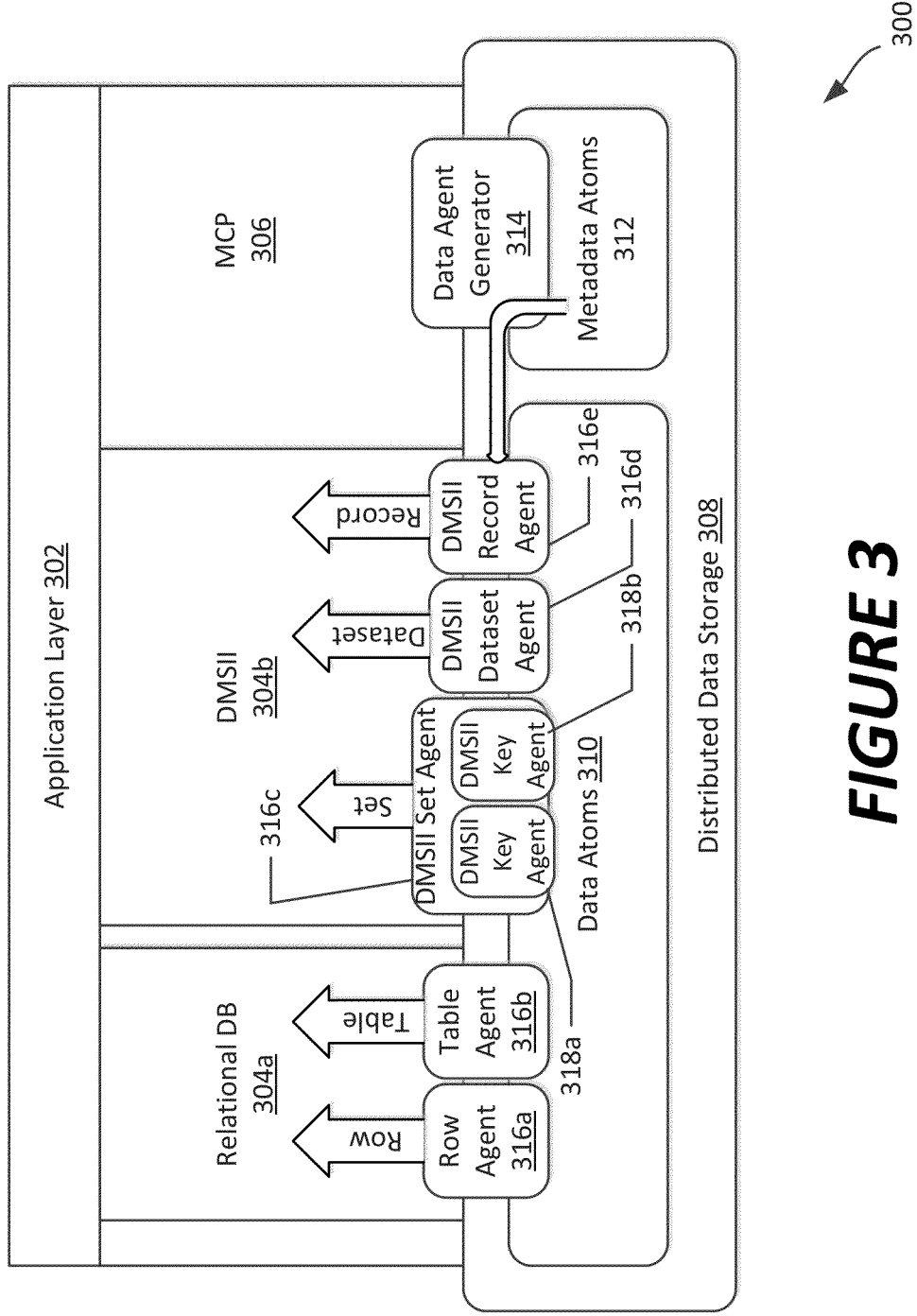
FIG. 3 is a logical diagram of aspects of a data storage system of FIGS. 1-2.

Now referring to FIG. 3, a general implementation of an example embodiment of a system 300 incorporating a common data store, such as the common data store 202 of FIG. 2, is shown. The system 300 generally includes an application layer 302 capable of accessing various data personalities 304, examples of which, 304a-b, represent a relational database and a DMSII database. In the embodiment shown, a separate environment hosts an MCP system 306, which can be located on a different partition from either of the data personalities, and is configured to host aspects of the common data store. In other words, the MCP system 306 acts as a service engine supporting data retrieval according to the data personalities 304a-b, as would be dictated by query and storage commands received at those data personalities from the application layer.

A data layer 308 resides beneath the data personalities 304a-b, and can be executed across a plurality of partitions within a virtual environment. The data layer 308 includes data atoms 310 and metadata atoms 312. The data atoms 310 generally include data stored via any of the data personalities 304, but separated from the format or structure in which that data is stored. In other words, the data atoms 310 have a data model neutral format in which the structure of the data (i.e. its position on disk relative to other data) does not define interrelationships of the data (e.g., in a table/row format such as in a relational database, or in a hierarchical dataset/record arrangement).

In contrast to the data records of a DMSII database, or tuples stored by a SQL database, in the example embodiments of the data atoms 310, the data atoms can be implemented in key-value pairs, where the metadata atoms 312 associate keys with the specific logical format of that data. In other embodiments, other data model neutral data formats could be used, such as a triple, or some other type of data arrangement. In some embodiments, the data is stored in a resource description framework (RDF). In such embodiments, the data is stored in records that include a number of data atoms, and associated metadata describing the interrelationships among the data, but which can be stored separately from the data. Similarly, the metadata atoms 310 can be maintained in key-value pairs or other analogous structures, and define databases based on a description of the database schema, for example which may be received at the data layer 308 in an XMI or other markup language format, thereby allowing decoupling of structure (in the metadata) from the data values themselves.

In the embodiment shown, each of the data personalities 304 have associated therewith a set of one or more agents useable to format data received from the data atoms 310 into an arrangement that is expected by that data personality 304. Although the particular format of the data to be returned to the data personality may vary, in some embodiments the structure corresponds to a data block that contains data responsive to a query, formatted in an arrangement as expected by the data personality. For example, the structure could be a block of data containing records in a format normally returned from a portion of a table or tables of a relational database, or dataset and record entries including one or more entries responsive to a query of a hierarchical database. In other words, the data returned to a data personality is returned in a way that is consistent with the data model associated with that data personality. The data personality, representing the database management system (albeit without managing the underlying data) will receive the data block having a recognizable structure to that data personality, and will extract the responsive data from that data block for return to the application from which a query or other data request was received.

To implement the above arrangement, in the particular example embodiment shown, a data agent generator 314 manages metadata describing data formats and/or data format types associated with data collections defined using each of the associated data personalities 304. The data agent generator 314 maintains the collection of metadata atoms 312 that describe each of the data formats of databases, and generates data agents 316 associated with each data personality 304 that can format the data stored in a data model neutral format. In the embodiment shown, the data agent generator 314 generates a row agent 316a and a table agent 316b for response to data inquiries and storing data associated with a relational personality 304a. The data agent generator 314 also generates a set agent 316c, as well as a data set agent 316d and a record agent 316e associated with a DMSII data personality. In the embodiment shown, the set agent 316c includes sub-agents, such as DMSII key agents 318a-b, which can be used to interrelate records based on keys provided within the DMSII database architecture, and which are tracked in the metadata atoms 312.

Based on the personality to which the data agent interfaces, different types of data agents could be generated by the data agent generator 314, incorporating metadata as defined in the metadata atoms 312. When the data agents receive requests for data from the various data personalities 304, those data agents can manage requests for a receipt of data from the underlying data atoms 310. The data agents 316 can also manage the various tasks typically performed in database management systems but not intrinsically tied to the structure of the data, such as transaction management, recovery, backup, and other data functions.

In connection with both FIGS. 2-3, it is noted that the data atoms 310 generally represent data stored in a plurality of databases or other data structures; as such, in typical arrangements the data atoms are stored across a plurality of computing systems. In such embodiments, the data atoms 310 are generally distributed across a number of computing systems, or partitions. As such, in typical implementations of such systems requested data is to be retrieved from more than one computing system or partition. Accordingly, within the common data store 202, an implementation for data model neutral data retrieval is implemented in which massively-parallel queries can be processed and query results compiled and returned. In one example embodiment, the common data store implements a map-reduce technique for query processing and/or storage, such as the Hadoop Map-Reduce algorithm. Other data processing implementations could be used as well.

Referring to FIGS. 1-3 overall, it is noted that these overall systems allow for use of data personalities by application programs in the same manner as is traditionally provided by database management systems. Accordingly, since such an arrangement is typically located in a large-scale multi-server environment, applications have a choice regarding the specific data personality from which data is requested, despite the fact that data may not have originally been stored using that data personality, and in implementations of FIGS. 2-3, the data is maintained in a common data store in a data model neutral format.

Figure 4:
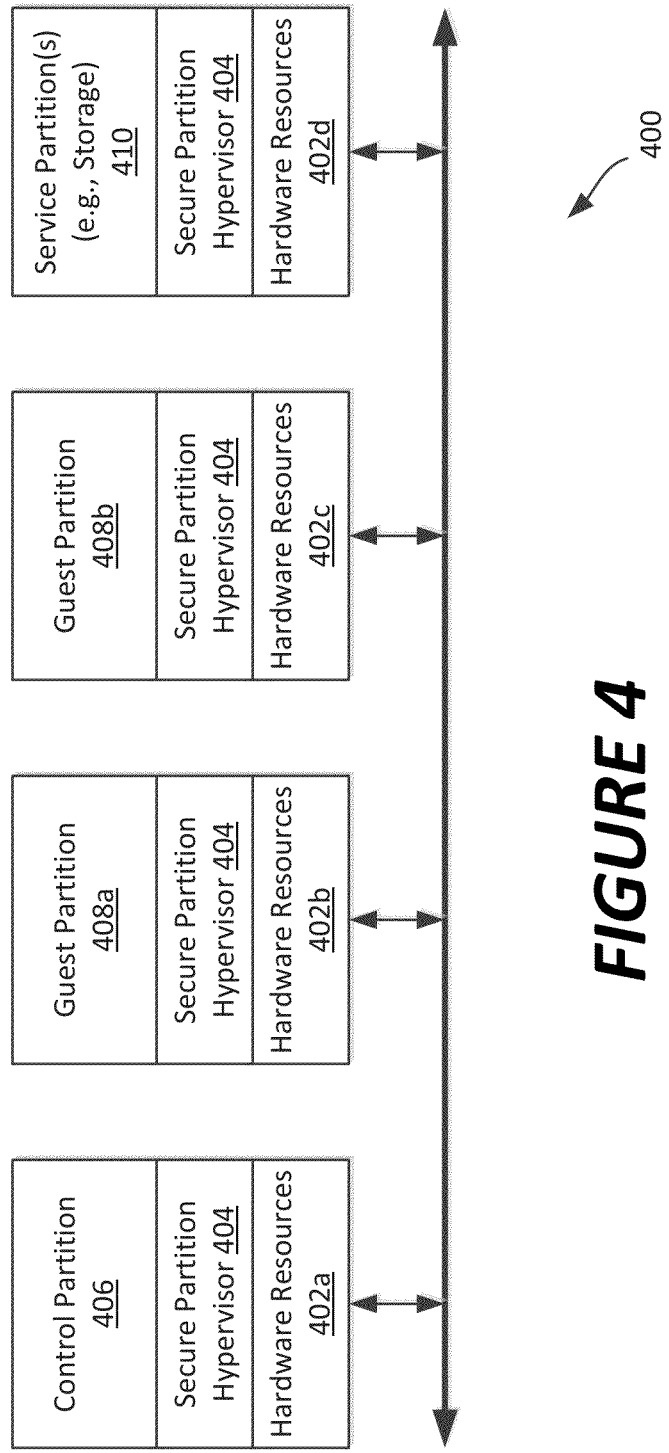
FIG. 4 is an example logical diagram illustrating a layout of computing resources in an environment implementing the data storage systems of FIGS. 1-3.

Referring now to FIG. 4, an example arrangement 400 of systems is illustrated, on which the systems of FIGS. 1-3 can be implemented. In the embodiment shown, the arrangement 400 includes a plurality of logical computing systems 402a-d, or partitions. Each of the logical computing systems 402a-d can include a collection of computing resources, such as a processor, memory resources, disk resource, network or communications resources, and other resources typically present on a computing system. An example of a collection of physical computing resources, formed as a typical discrete electronic computing system is described below in connection with FIG. 5.

In general, each of the logical computing systems 402a-d hosts secure partition services 404, which define the set of physical computing resources available to higher-layer software, as well as providing an interface between that higher-layer software and the physical computing resources allocated to the particular logical computing system 402. Furthermore, the partition services 404 provide virtualization and security services, as well as backup and recovery services, for each partition.

In the embodiment shown, the arrangement 400 includes a control partition 406, guest partitions 408a-b, and a services partition 410. The control partition 406 schedules allocation of additional partitions to various guest processes as desired. For example, the control partition 406 can execute a console application configured to allow reservation of resources for various guest partitions and/or service partitions. The guest partitions 408a-b can execute any of a variety of guest applications. For example, the guest partitions 408a-b can host separate database management systems or data personalities on different hosted operating systems (e.g., the relational and DMSII database management systems of FIG. 3). Still further guest partitions (not shown) could host data storage partitions, or an implementation of the common data bus or common data store, a map-reduce service operation useable by the common data store, or other types of services discussed above. A services partition 410 hosts one or more services useable by the guest partitions, such as for remote systems communications, data management/replication, or other services.

When implementing a system such as those shown in FIGS. 1-3 above in a virtualized computing arrangement such as is illustrated in FIG. 4, it is noted that although an example set of hosted, virtualized partitions are shown, other partitions could be included in such a system for hosting additional data personalities, applications, data nodes, data processing software, networking operations, or specialty processes. Furthermore, in some embodiments, at least some of the computing arrangements of FIGS. 1-3 can be implemented natively on a local system, rather than on a virtualized system.

Figure 5:
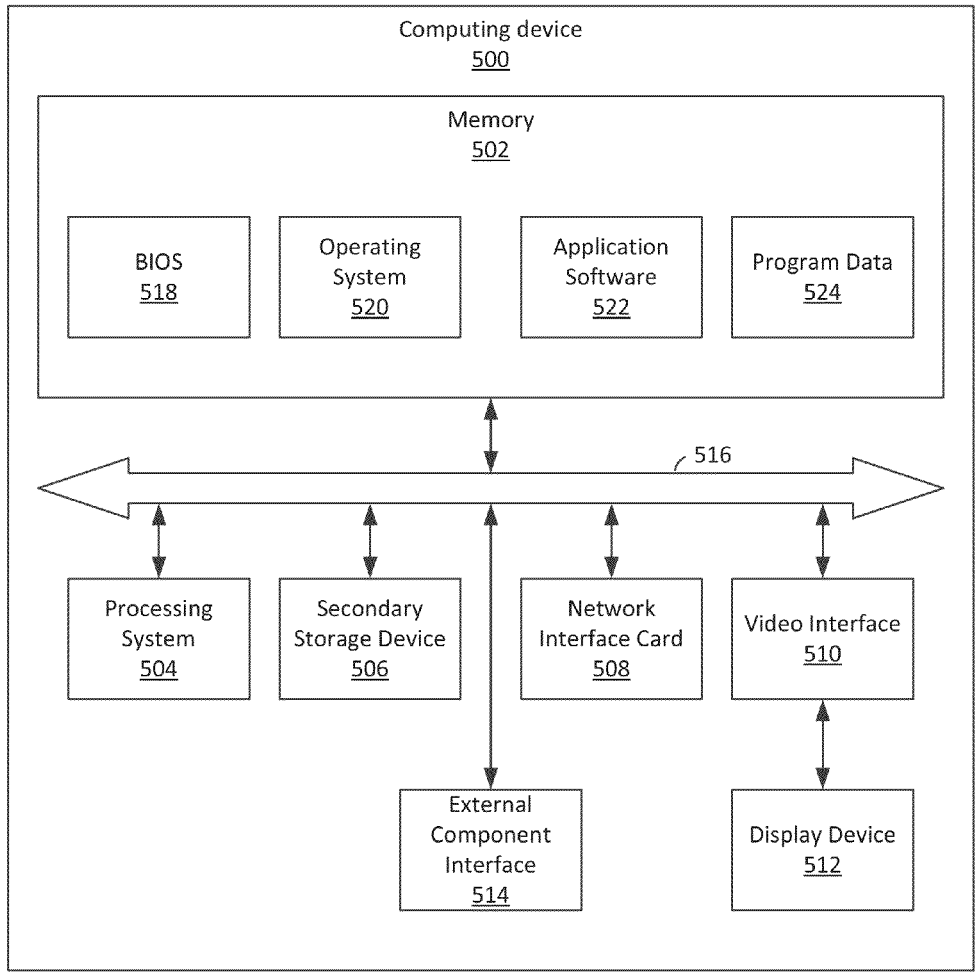
FIG. 5 is a block diagram of an electronic computer system useable within the data storage systems disclosed herein.

Referring now to FIG. 5, a schematic illustration of an example computing system in which aspects of the present disclosure can be implemented. The computing system 500 can represent, for example, a native computing system within which one or more of computing systems 402a-d, or with multiple of which any of systems 100-300 could be implemented.

In the example of FIG. 5, the computing device 500 includes a memory 502, a processing system 504, a secondary storage device 506, a network interface card 508, a video interface 510, a display unit 512, an external component interface 514, and a communication medium 516. The memory 502 includes one or more computer storage media capable of storing data and/or instructions. In different embodiments, the memory 502 is implemented in different ways. For example, the memory 502 can be implemented using various types of computer storage media.

The processing system 504 includes one or more processing units. A processing unit is a physical device or article of manufacture comprising one or more integrated circuits that selectively execute software instructions. In various embodiments, the processing system 504 is implemented in various ways. For example, the processing system 504 can be implemented as one or more processing cores. In another example, the processing system 504 can include one or more separate microprocessors. In yet another example embodiment, the processing system 504 can include an application-specific integrated circuit (ASIC) that provides specific functionality. In yet another example, the processing system 504 provides specific functionality by using an ASIC and by executing computer-executable instructions.

The secondary storage device 506 includes one or more computer storage media. The secondary storage device 506 stores data and software instructions not directly accessible by the processing system 504. In other words, the processing system 504 performs an I/O operation to retrieve data and/or software instructions from the secondary storage device 506. In various embodiments, the secondary storage device 506 includes various types of computer storage media. For example, the secondary storage device 506 can include one or more magnetic disks, magnetic tape drives, optical discs, solid state memory devices, and/or other types of computer storage media.

The network interface card 508 enables the computing device 500 to send data to and receive data from a communication network. In different embodiments, the network interface card 508 is implemented in different ways. For example, the network interface card 508 can be implemented as an Ethernet interface, a token-ring network interface, a fiber optic network interface, a wireless network interface (e.g., WiFi, WiMax, etc.), or another type of network interface.

The video interface 510 enables the computing device 500 to output video information to the display unit 512. The display unit 512 can be various types of devices for displaying video information, such as a cathode-ray tube display, an LCD display panel, a plasma screen display panel, a touch-sensitive display panel, an LED screen, or a projector. The video interface 510 can communicate with the display unit 512 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 514 enables the computing device 500 to communicate with external devices. For example, the external component interface 514 can be a USB interface, a FireWire interface, a serial port interface, a parallel port interface, a PS/2 interface, and/or another type of interface that enables the computing device 500 to communicate with external devices. In various embodiments, the external component interface 514 enables the computing device 500 to communicate with various external components, such as external storage devices, input devices, speakers, modems, media player docks, other computing devices, scanners, digital cameras, and fingerprint readers.

The communications medium 516 facilitates communication among the hardware components of the computing device 500. In the example of FIG. 5, the communications medium 516 facilitates communication among the memory 502, the processing system 504, the secondary storage device 506, the network interface card 508, the video interface 510, and the external component interface 514. The communications medium 516 can be implemented in various ways. For example, the communications medium 516 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518 and an operating system 520. The BIOS 518 includes a set of computer-executable instructions that, when executed by the processing system 504, cause the computing device 500 to boot up. The operating system 520 includes a set of computer-executable instructions that, when executed by the processing system 504, cause the computing device 500 to provide an operating system that coordinates the activities and sharing of resources of the computing device 500. Furthermore, the memory 502 stores application software 522. The application software 522 includes computer-executable instructions, that when executed by the processing system 504, cause the computing device 500 to provide one or more applications. The memory 502 also stores program data 524. The program data 524 is data used by programs that execute on the computing device 500.

Although particular features are discussed herein as included within an electronic computing device 500, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. However, such computer readable media, and in particular computer readable storage media, are generally implemented via systems that include at least some non-transitory storage of instructions and data that implements the subject matter disclosed herein.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6:
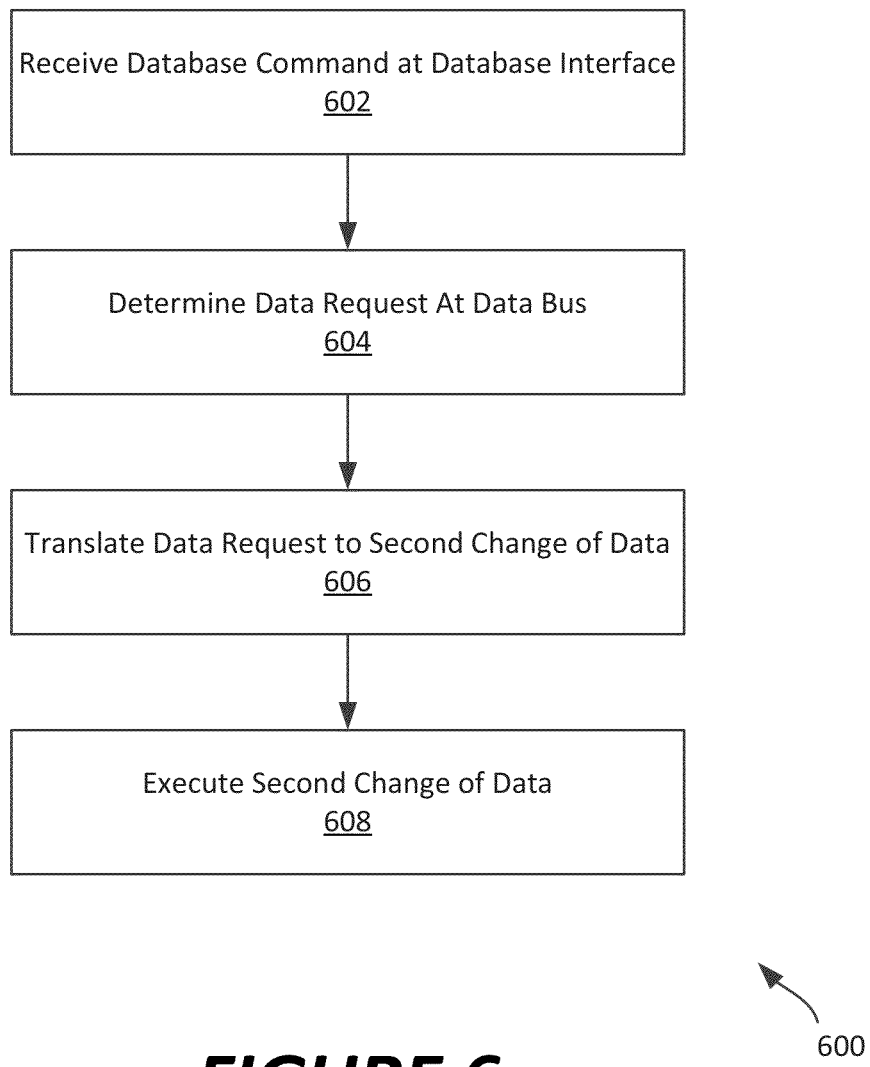
FIG. 6 is a flowchart of a method for managing distributed data across a plurality of data model types, according to an example embodiment.
Figure 7:
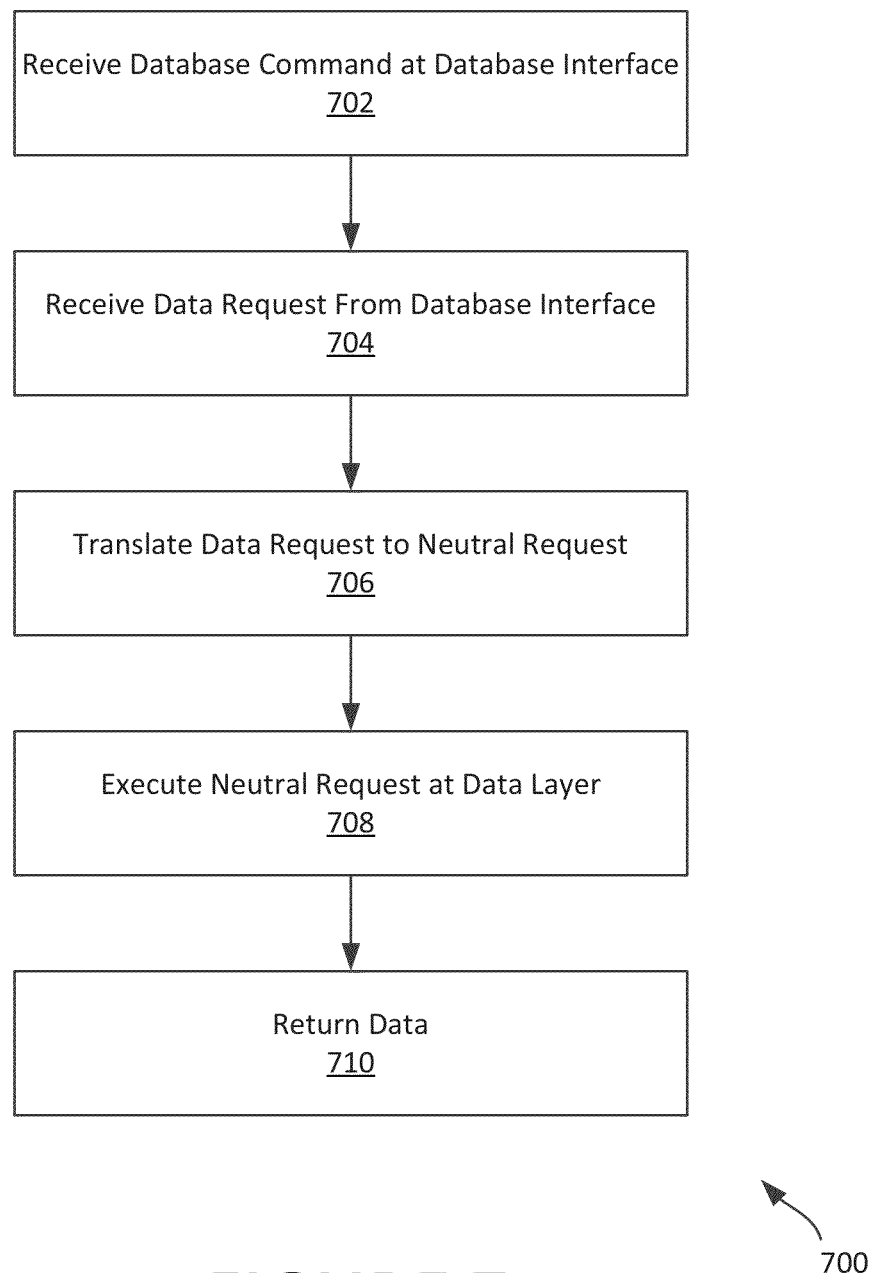
FIG. 7 is a flowchart of a method for managing distributed data using any of a plurality of data models, according to an example embodiment.
Figure 8:
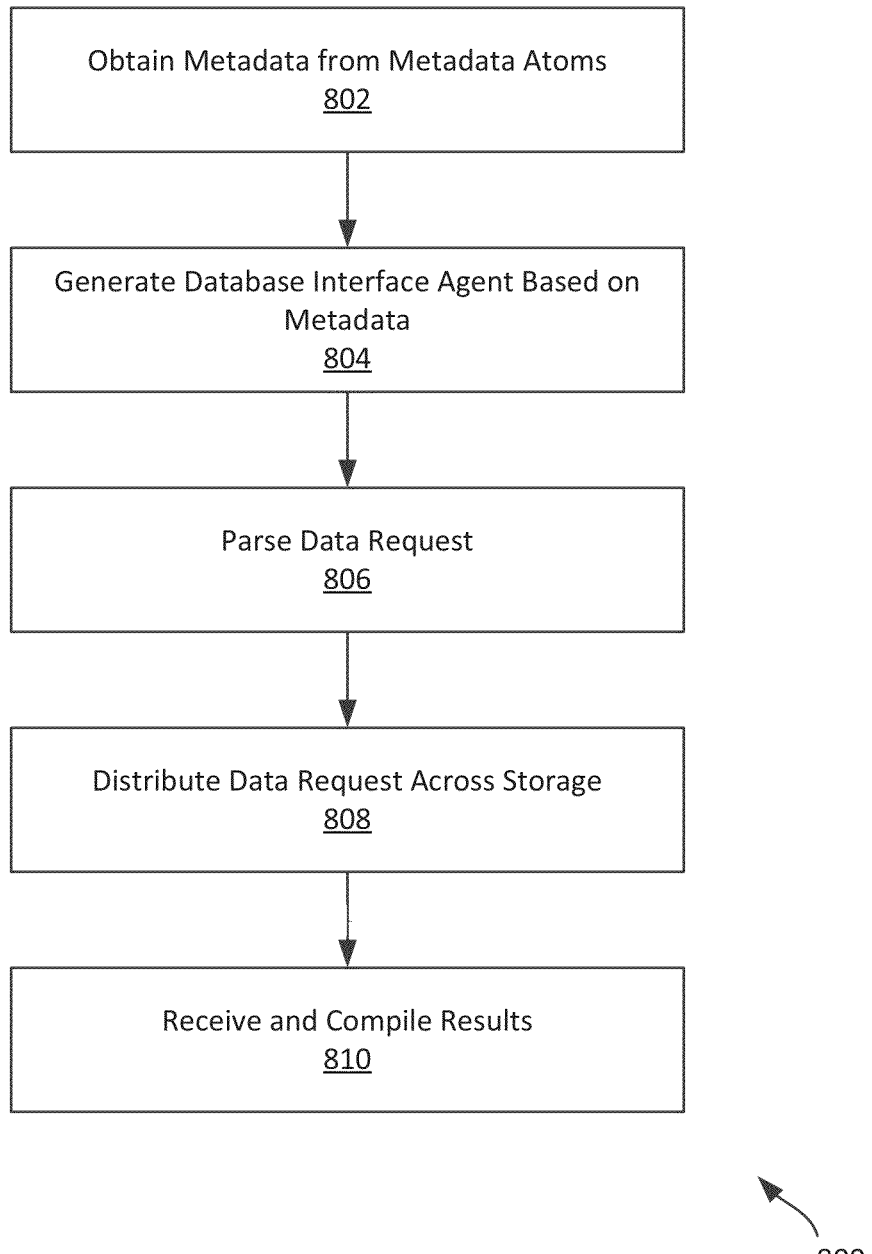
FIG. 8 is a flowchart of a method for handling a data request based on a database command received from a database interface, according to an example embodiment.

Referring now to FIGS. 6-8, example methods for managing distributed data according the various embodiments described above in connection with FIGS. 1-5. FIG. 6 illustrates a flowchart representing a method 600 for managing distributed data across a plurality of data model types, according to an example embodiment. FIG. 6 therefore represents a method 600 that can be performed by a common data bus, such as the common data bus 108 of FIG. 1 or the common data bus 204 of FIG. 2.

The method 600 of FIG. 6 begins when a data personality receives a database command (step 602). The database command can be, for example a query or a data storage command, or other types of commands expected to be received by a particular type of database management system analogous to that data personality. The database command can, in various embodiments, effect a change on data managed at the database associated with that data personality.

In response to a detected change in the data managed by the data personality receiving the database command, the common data bus will detect a data request (i.e., a request to provide or request to change data in a particular database), and an analogous data request will be formed by the common data bus. In the event the common data bus is interfaced to a common data store, the data request can be to form a data model neutral change in data that would be analogous to the data change reflected by the data request. In the event of a data change, the common data bus (or alternatively, the data personality issuing the original data request) will issue a data request at the common data bus. That request will then be translated to a second type of data request (step 606). The second type of data request can take any of a number of forms, but generally is configured to replicate a change of data from the data personality receiving the request in a second data store having a different format from that data personality receiving an original database command. For example, the second data request can be a data model neutral data request, or can be a data request in a different data model (i.e., at a different data personality) as compared to the original request. The second data request, if executed in a common data bus, causes synchronization of the data personality that is the target of the second data request with the data personality originally receiving the database command (step 608).

It is noted that, depending upon the number of different data personalities, the translation and execution of the first data request to different types of data requests may occur many times, such that each data personality maintains a synchronized set of data with each of the other data personalities. Additionally, in some cases, the specific data personalities to be synchronized for each database or data collection can be user selectable, thereby controlling the number of data personalities requiring synchronization.

Referring now to FIG. 7, a flowchart of a method 700 for managing distributed data using any of a plurality of data models, according to an example embodiment. The method 700 is generally executable within a common data store, such as data store 202 of FIG. 2, with portions of the method 700 performed by agents and/or an agent generator within the common data store.

In the embodiment shown, the method 700 begins when a database command is received at a data personality, also known in this instance as a database interface (step 702). The data personality can be referred to as a database interface in this case because the each of the data personalities, rather than storing data, represent an interface to data stored in an underlying common data store. The data personality performs a first data request based on the database command received by the data personality (step 704). The data request is generally a request for data from an underlying data collection, which would normally be issued from a database management system to an underlying database file system; however in the present disclosure, the data request is passed to a common data store. This can be, for example, issued to one or more data agents, such as the agents illustrated in FIG. 3, as generated by a data agent generator specific to each data personality.

The common data bus will receive the data request, and translate that data request to a second data request in a data model neutral format (step 706). For example, one or more data atoms will receive the data request and translate that data request to one or more data model neutral search or data operations, for example using a map-reduce operation across data distributed on a large number of physical systems in data model neutral data atoms. That data model neutral request will then be executed (step 708), managed by the data agents, and data will be returned via the data agents to the data personality from which the data request is received (step 710).

Referring now to FIG. 8, a further method 800 for handling a data request is illustrated, based on a database command received from a database interface, according to an example embodiment. The method 800 may be performed, for example, at a common data store, such as data store 202 as illustrated in FIG. 2, using agents and associated data and metadata atoms as illustrated in connection with FIG. 3.

In general the method 800 is performed using one or more data personalities, or database interfaces, that have been preconfigured with the common data store (i.e., which the common data store has metadata regarding the structure of databases managed by that data personality). In the embodiment shown, the method 800 includes obtaining, from a metadata agent, metadata describing a logical structure of the database associated with that particular data personality (step 802). This can include, for example, obtaining metadata from a metadata store that was extracted from or otherwise separated from data that is stored in the common data store in a data model neutral format.

Once the metadata is obtained, the metadata agent can generate one or more database interface agents based on that metadata (step 804). The database interface agents are generated to be capable of parsing data and data requests received from a data personality, as well as to collect and logically arrange data to be returned to the data personality in response to a data request from that data personality. In some embodiments, the data agents are generated based on the metadata describing the personality to be interfaced to the common data store.

In the embodiment shown, the method 800 will continue upon receipt of a data request at the common data store, for example from a data personality (step 806). The data request is received at one or more agents interfaced to the data personality, to determine the type of data request that is being made. For example, the data request can be to store data in a particular logical location within a database, to retrieve data, to obtain a record count, or other types of database actions. Based on that data request, the agent receiving the data request will parse the request to determine one or more actions to be taken across the distributed data storage systems associated with the common data store, and distribute that data request across the storage systems to obtain or modify data as required (step 808). To the extent any results are required (e.g., either acknowledgement of completed storage of data, or receipt of data in response to a query or record count operation), those results are formatted by the agent(s) associated with the data personality to be in a form understandable by the data personality (step 810). The results can then be passed back to the data personality, as if coming from an underlying data storage having a logical organization dictated by that data personality.

Referring to FIGS. 1-8 generally, it is recognized that the various systems and methods described herein provide a number of advantages over existing database systems, and in particular for large-scale, large fanout databases requiring many physical computing systems for implementation. For example, the various virtualization services on which the systems are provided allows for customized workload assignment, by placing the common data bus or common data store on entirely separate hardware resources as compared to the various data personalities which they serve. Additionally, due to the common storage of data in a format easily and quickly searched regardless of the interface from which a query or other database command is received, data retrieval times can be reduced, due to a lack of a requirement to replicate data if a common data store is used, as well as due to distribution of query tasks across many partitions to avoid bogging down one particular hardware system with many complicated data requests.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A computer-implemented method for managing distributed data using any of a plurality of data model types, the method comprising:
   receiving a data request from one of a plurality of database interfaces, each database interface associated with a different data model type;
   translating the data request to a second data request based at least in part on a data model neutral description of a data model that is associated with data and the database interface, wherein the second data request comprises a data model neutral request and the data model neutral description is included with a plurality of descriptions of each of a plurality of different data models corresponding to the different data model types;
   executing the second data request, thereby reflecting the data request in data storage such that data is managed consistently across each of the plurality of database interfaces;
   wherein executing the data model neutral request occurs within a data model neutral data layer and issues a plurality of divided data request tasks to each of a plurality of computing systems configured to store data in the data model neutral data layer, the data model neutral data layer including data storage distributed across a plurality of computing systems; and
   receiving data from the data model neutral data layer and translating the data to a format recognizable to the database interface.

2. The computer-implemented method of claim 1, further comprising communicating the translated data to the database interface in a format expected by the database interface.

3. The computer-implemented method of claim 1, further comprising:
   receiving a second data request from a second database interface from among the plurality of database interfaces, the second database interface different from the database interface associated with the data request and associated with a different data model type as compared to the database interface associated with the data request;
   translating the second data request to a second data model neutral data request based at least in part on a description of the second data model; and
   executing the second data model neutral data request within the data model neutral data layer;
   wherein the data request and the second data request implicate data stored in the data model neutral data layer that is accessible by both of the plurality of database interfaces including the database interface and the second database interface, and
   wherein the data model and the second data model comprise different views of the data implicated by the data request and the second data request.

4. The computer-implemented method of claim 3, wherein the format expected by the database interface comprises a data block including data responsive to the query.

5. The computer-implemented method of claim 1, wherein translating the data request to a data model neutral data request includes translating the data request via a data agent residing within the data model neutral data layer and affiliated with the database interface.

6. The computer-implemented method of claim 1, wherein translating the data request to a data model neutral data request includes determining a data model based on metadata describing the data model of the database interface, the metadata managed via a metadata agent residing within the data model neutral data layer.

7. The computer-implemented method of claim 1, further comprising receiving a query from an application level program at the database interface, thereby causing the database interface to form the data request.

8. The computer-implemented method of claim 1, wherein the data request is based on a database command received at the database interface.

9. The computer-implemented method of claim 1, wherein the database command is included within a set of database commands recognizable by the database interface, and wherein each of the database interfaces have different sets of database commands.

10. The computer-implemented method of claim 1, wherein translating the data request occurs in a data bus layer interconnecting the plurality of database interfaces.

11. The computer-implemented method of claim 10, further comprising replicating the database command across each of the database interfaces, the database interfaces each comprising separate database management systems.

12. The computer-implemented method of claim 1, wherein the data model types associated with the plurality of database interfaces are selected from a group of data model types consisting of:
   a relational data model type;
   a hierarchical data model type;
   a columnar data model type;
   a network data model type;
   a record data model type;
   a stream data model type;
   a multidimensional data model type; and
   an object-oriented data model type.

13. A data storage system comprising:
   a plurality of database interfaces each associated with a different data model type and having a different set of database commands associated therewith;
   a data model neutral data layer including data storage distributed across the memory of a plurality of computing systems,
   a processor configured to:
      translate a data request to a second data request based at least in part on a data model neutral description of a data model that is associated with data and a database interface, wherein the second data request comprises a data model neutral request and the data model neutral description is included with a plurality of descriptions of each of a plurality of different data models corresponding to the different data model types;
      execute the second data request, thereby reflecting the data request in data storage such that data is managed consistently across each of the plurality of database interfaces;
      wherein executing the data model neutral request occurs within a data model neutral data layer and issues a plurality of divided data request tasks to each of a plurality of computing systems configured to store data in the data model neutral data layer, the data model neutral data layer including data storage distributed across a plurality of computing systems; and
      receive data from the data model neutral data layer and translating the data to a format recognizable to the database interface.

14. The data storage system of claim 13, wherein the data model neutral data layer is configured to, in response to receipt of data model neutral data requests, issue a plurality of divided data request tasks to each of a plurality of computing systems configured to store data in the data model neutral data layer.

15. The data storage system of claim 13, further comprising an application level program interfaced to at least one database interface of the plurality of database interfaces, the application level program configured to issue database commands to the at least one database interface from among a set of database commands supported by the at least one database interface.

16. The data storage system of claim 13, wherein the data model types associated with the plurality of database interfaces are selected from a group of data model types consisting of:
- a relational data model type;
- a hierarchical data model type;
- a columnar data model type;
- a network data model type;
- a record data model type;
- a stream data model type;
- a multidimensional data model type; and
- an object-oriented data model type.

17. The data storage system of claim 13, further comprising a plurality of database agents residing within the data model neutral data layer, each of the plurality of database agents associated with a particular data model type and configured to provide translations between the database interface associated with that data model type and the data model neutral data layer.

18. The data storage system of claim 17, further comprising a data agent generator configured to generate the plurality of database agents based at least in part on metadata atoms describing data models having data model types associated with each of the database interfaces.

19. The data storage system of claim 13, wherein the data model neutral data layer is configured to store data across the plurality of computing systems in a plurality of data atoms.

20. The data storage system of claim 19, wherein each of the data atoms is configured to be stored in a key-value pair.

21. The data storage system of claim 13, further comprising a data bus layer interposed between the data model neutral data layer and each of the plurality of database interfaces.

* * * * *